United States Patent [19]
Turner et al.

[11] 3,910,941

[45] Oct. 7, 1975

[54] IMIDAZO HETEROCYCLIC DERIVATIVES

[75] Inventors: Ralph William Turner; Timothy Paul Seden, both of Macclesfield, England

[73] Assignee: Imperial Chemical Industries Limited, London, England

[22] Filed: Mar. 8, 1974

[21] Appl. No.: 449,556

[30] Foreign Application Priority Data
Mar. 22, 1973 United Kingdom............ 13795/73

[52] U.S. Cl. ...... 260/306.7 T; 260/243 R; 424/246; 424/270
[51] Int. Cl.² .................................... C07D 513/04
[58] Field of Search ................. 260/306.7 T, 243 R

[56] References Cited
UNITED STATES PATENTS

| | | |
|---|---|---|
| 2,933,497 | 4/1960 | Dodson ........................ 260/306.7 T |
| 3,557,110 | 1/1971 | Anderson et al............ 260/306.7 T |
| 3,708,490 | 1/1973 | Spicer et al. ................ 260/306.7 T |

Primary Examiner—Richard J. Gallagher
Attorney, Agent, or Firm—Cushman, Darby & Cushman

[57] ABSTRACT

The disclosure relates to new substituted imidazo heterocyclic derivatives which possess antidepressant activity, to processes for the manufacture of said derivatives and to pharmaceutical compositions containing them. Typical of the imidazo heterocyclic derivatives disclosed is trans-5-(4-dimethylaminophenyl)-6-(threo-1-hydroxyethyl)-2,3,5,6-tetrahydroimidazo[2,1-b]thiazole.

4 Claims, No Drawings

IMIDAZO HETEROCYCLIC DERIVATIVES

This invention relates to novel imidazo heterocyclic derivatives which possess antidepressant properties.

According to the invention there is provided an imidazo heterocyclic derivative of the formula:

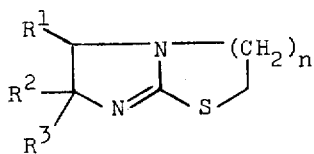

wherein $R^1$ is a hydrogen atom, an unsubstituted phenyl, naphthyl, furyl, thienyl or pyridyl radical, or a phenyl radical substituted by 1 or 2 substituents selected from halogen atoms, alkyl, haloalkyl, alkoxy and alkylthio radicals of 1 to 4 carbon atoms, dialkylamino and acylamino radicals each of up to 6 carbon atoms, and nitro radicals; $R^2$ is a radical of the formula $R^4CO$ or a radical of the formula:

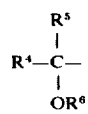

II wherein $R^4$ is a hydrogen atom, an alkyl radical of 1 to 6 carbon atoms, an alkenyl or alkynyl radical of up to 6 carbon atoms, a phenylalkyl radical of up to 8 carbon atoms, a thienyl radical, or a phenyl radical optionally substituted by a halogen atom; $R^5$ is a hydrogen atom, an alkyl radical of 1 to 6 carbon atoms, an alkenyl or alkynyl radical of up to 6 carbon atoms or a phenylalkyl radical of up to 8 carbon atoms; $R^6$ is a hydrogen atom, an alkyl radical of 1 to 6 carbon atoms, an alkenyl radical of up to 6 carbon atoms or a phenylalkyl or acyl radical of up to 8 carbon atoms; $R^3$ is a hydrogen atom or an alkyl radical of 1 or 2 carbon atoms; and n is 1 or 2; and the pharmaceutically-acceptable acid-addition salts thereof.

It will be observed that the imidazo heterocyclic derivative of the invention can posses 1, 2 or 3 asymmetric carbon atoms. Thus the carbon atom to which $R^2$ is attached is asymmetric. When $R^1$ is other than a hydrogen atom the carbon atom to which it is attached is asymmetric. When $R^2$ stands for a radical of the formula:

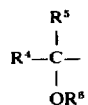

II in which $R^4$ and $R^5$ are different, the carbon atom to which $R^4$ and $R^5$ are attached is asymmetric. The compound of the invention may therefore exist in 1, 2 or 4 stereoisomeric forms, and each racemic form may be resolved into two optically-active enantiomeric forms. The number of possible isomers may be summarised as follows:

| Number of asymmetric carbon atoms | Number of racemic stereoisomeric forms | Number of opically enantiomeric forms |
|---|---|---|
| 1 | 1 | 2 |
| 2 | 2 | 4 |
| 3 | 4 | 8 |

The extent to which these racemic isomers and optically-active enantiomers will possess the useful properties of the compounds of the invention, as hereafter defined, may differ, and it is therefor to be understood that this invention encompasses any racemic stereoisomer and any optically-active enantiomeric form which possesses such a useful property.

It will also be observed that $R^1$ and $R^2$ may project from the same side, or from opposite sides, of the imidazo ring. In this specification these stereochemical arrangements are designated cis and trans respectively. Thus the following compound has the trans configuration:

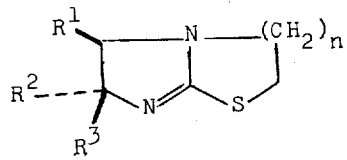

When no specific stereochemical arrangement is illustrated in any particular formula in this specification, it is to be understood that it may represent the cis isomer, the trans isomer, or a mixture of the cis and trans isomers.

In this specification, when $R^3$ and $R^5$ are hydrogen atoms and $R^4$ is other than a hydrogen atom, we define the possible stereochemical arrangements of substituents as erythro and threo isomers:

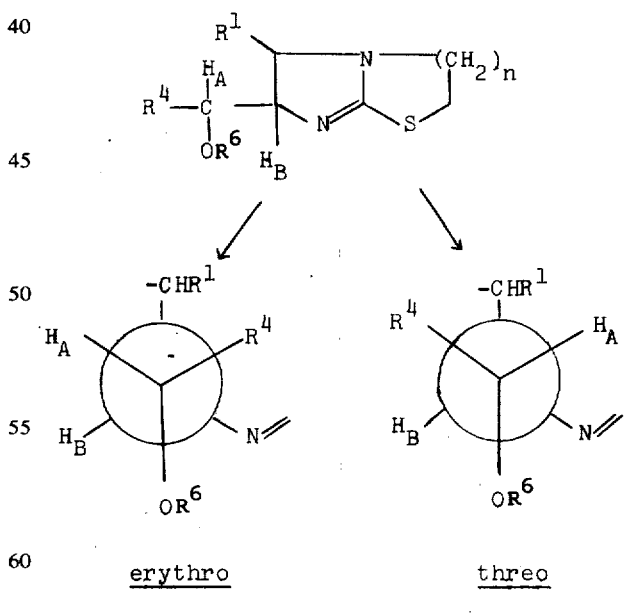

A pair of isomers may be distinguished by examination of their n.m.r. spectra in $d_6$DMSO solution. The erythro isomer has a coupling constant between hydrogens $H_A$ and $H_B$ ($J_{AB}$) of 3-4 cycles per second (c.p.s.) while the threo isomer has $J_{AB}$ of about 6 c.p.s. When $R^4$ is a methyl radical, it appears in the erythro isomer as a methyl doublet at low field, and in the threo isomer as a methyl doublet at high field.

A particular group of compounds comprises those in which $R^1$ and $R^2$ are trans to each other.

A further particular group of compounds comprises those in which $R^2$ is a radical of the formula:

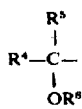

II

A particular value for a substituent on $R^1$ when $R^1$ is a phenyl radical, is a fluorine, chlorine or bromine atom or a methyl, isopropyl, trifluoromethyl, methoxy, methylthio, dimethylamino, acetylamino or nitro radical. Within this group a particularly useful substituent is a 4-dimethylamino, 4-bromo, 3-trifluoromethyl or 3,4-dichloro substituent.

A particular value for $R^4$ is a hydrogen atom or a methyl, ethyl, n-propyl, n-butyl, vinyl, benzyl, phenyl, chlorophenyl or thienyl radical.

A particular value for $R^5$ is a hydrogen atom or a methyl, ethyl, n-propyl, vinyl or benzyl radical.

A particular value for $R^6$ is a hydrogen atom or a methyl, allyl, benzyl, aroyl of up to 8 carbon atoms, for example benzoyl, or alkanoyl of up to 6 carbon atoms, for example acetyl, radical.

A particular value for $R^3$ is a hydrogen atom or a methyl or ethyl radical.

A particularly suitable value for $R^2$ is a 1-hydroxyethyl, 1-hydroxy-1-methylethyl, 1-hydroxy-n-propyl, 1-hydroxy-1-methyl-n-butyl, 1-ethyl-1-hydroxy-n-propyl or 1-hydroxy-1-vinylprop-2-enyl radical.

Particular compounds of the invention are trans-6-(1-hydroxy-1-methyl-n-butyl)-5-phenyl-2,3,5,6-tetrahydroimidazo[2,1-b]thiazole, trans-5-(4-dimethylaminophenyl)-6-(threo-1-hydroxyethyl)-2,3,5,6-tetrahydroimidazo[2,1-b]thiazole, trans-6-(1-ethyl-1-hydroxy-n-propyl)-5-phenyl-2,3,5,6-tetrahydroimidazo[2,1-b]thiazole, trans-5-(3,4-dichlorophenyl)-6-(1-ethyl-1-hydroxy-n-propyl)-2,3,5,6-tetrahydroimidazo[2,1-b]-thiazole, cis-5-(3,4-dichlorophenyl)-6-(1-ethyl-1-hydroxy-n-propyl)-2,3,5,6-tetrahydroimidazo[2,1-b]thiazole, and trans-6-(1-ethynyl-1-hydroxyprop-2-ynyl)-5-(3,4-dichlorophenyl)-2,3,5,6-tetrahydroimidazo[2,1-b]thiazole.

A suitable acid-addition salt of the imidazo heterocyclic derivative of the invention is, for example, a hydrochloride, hydrobromide, phosphate or sulphate or a citrate, acetate, oxalate, methanesulphonate, toluene-p-sulphonate, tartrate, maleate, gluconate or resinate.

The imidazo heterocyclic derivative of the invention may be manufactured by methods known in themselves for the manufacture of chemically analogous compounds, for example:

a. for a compound in which $R^2$ is a radical of the formula $R^4CO$, $R^3$ is a hydrogen atom, and $R^1$ and $R^2$ are trans to each other, reacting a compound of the formula:

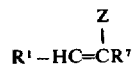

III wherein $R^1$ has the meaning stated above, $R^7$ is a radical of the formula $R^4CO$ in which $R^4$ has the meaning stated above and Z stands for a chlorine, bromide or iodine atom, with a compound of the formula:

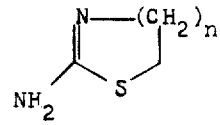

IV wherein $n$ has the meaning stated above. The reaction may be carried out in the presence of a base, for example triethylamine, in a solvent, for example ethyl acetate, and may be accelerated or completed by the application of heat. The reaction is preferably carried out in an atmosphere of nitrogen.

b. reacting a compound of the formula:

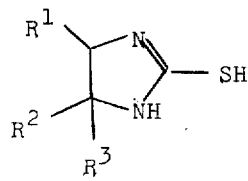

V wherein $R^1$, $R^2$ and $R^3$ have the meanings stated above with a compound of the formula $X(CH_2)_{n+1}Y$, wherein X and Y, which may be the same or different, are displaceable halogen atoms, for example chlorine or bromine atoms, or arenesulphonyloxy or alkanesulphonyloxy radicals, for example toluene-p-sulphonyloxy or methanesulphonyloxy radicals. The reaction may be carried out in the presence of a base, for example, potassium carbonate or bicarbonate, in a solvent such as ethanol or isopropanol, and may be accelerated or completed by the application of heat.

c. for a compound in which $R^2$ is a radical of the formula:

II in which $R^6$ is a hydrogen atom and $R^5$ is an alkyl radical of 1 to 6 carbon atoms, an alkenyl or alkynyl radical of up to 6 carbon atoms or a phenylalkyl radical of up to 8 carbon atoms, reacting a compound of the formula:

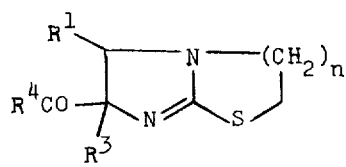

VI wherein $R^1$, $R^3$, $R^4$ and $n$ have the meanings stated above, with a compound of the formula $R^8Li$ or $R^8MgZ$ in which $R^8$ is an alkyl radical of 1 to 6 carbon atoms, an alkenyl or alkynyl radical of up to 6 carbon atoms or a phenylalkyl radical of up to 8 carbon atoms, and Z is as above. The reaction may be carried out in a solvent, for example ether or tetrahydrofuran, and may be accelerated or completed by the application of heat.

d. for a compound in which $R^2$ is a radical of the formula:

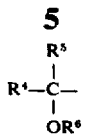

in which $R^5$ and $R^6$ are both hydrogen atoms, reducing a compound of the formula:

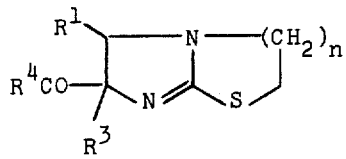

wherein $R^1$, $R^3$, $R^4$ and n have the meanings stated above, for example with sodium borohydride, a Meerwein Pondorf reagent such as di-isonorbornyl aluminium isopropoxide, or with potassium tri-s-butyl borohydride, dicyclohexylborane, or lithium aluminium hydride. The reaction may be carried out in a solvent such as ethanol for sodium borohydride, toluene for di-isonorbornyl aluminium isopropoxide, or tetrahydrofuran.

e. for a compound in which $R^2$ is a radical of the formula:

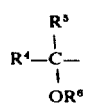

in which $R^6$ is an alkyl radical of 1 to 6 carbon atoms, an alkenyl radical of up to 6 carbon atoms or an phenylalkyl radical of up to 8 carbon atoms, reacting a compound of the formula:

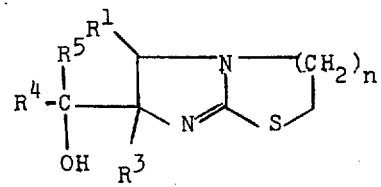

in which $R^1$, $R^3$, $R^4$, $R^5$ and n have the meanings stated above with a compound of the formula $R^9X$ in which $R^9$ is an alkyl radical of 1 to 6 carbon atoms, an alkenyl radical of up to 6 carbon atoms or an phenylalkyl radical of up to 8 carbon atoms, and X is as above, in the presence of a base. The base may be, for example, sodium hydride or sodium ethoxide, and the reaction may be carried out in a solvent such as tetrahydrofuran.

f. for a compound in which $R^2$ is a radical of the formula:

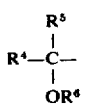

in which $R^6$ is an acyl radical of up to 8 carbon atoms, reacting a compound of the formula:

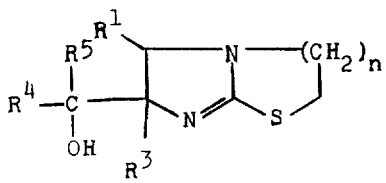

in which $R^1$, $R^3$, $R^4$, $R^5$ and n have the meanings stated above, with an acid, or an acylating agent derived from an acid, of the formula $R^{10}CO.OH$ in which $R^{10}$ is a hydrogen atom, an alkyl radical of up to 5 carbon atoms or an aryl radical of up to 7 carbon atoms. A particularly suitable acylating agent is one of the formula $R^{10}COCL$ or $(R^{10}CO)_2O$. The reaction may be carried out in a solvent such as tetrahydrofuran or dioxan, in the presence of a base such as triethylamine, or in pyridine, and may be accelerated or completed by the application of heat.

g. for a compound in which $R^2$ is a radical of the formula:

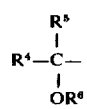

in which $R^4$ and $R^5$ are the same and are alkyl radicals of 1 to 6 carbon atoms, alkenyl or alkynyl radicals of up to 6 carbon atoms or phenylalkyl radicals of up to 8 carbon atoms, and $R^6$ is a hydrogen atom reacting a compound of the formula:

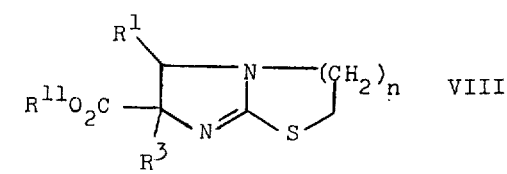

in which $R^1$, $R^3$ and n have the meanings stated above and $R^{11}$ is a hydrogen atom or an alkyl radical of 1 to 6 carbon atoms, with a compound of the formula $R^{12}MgZ$ or $R^{12}Li$ in which $R^{12}$ is an alkyl radical of up to 6 carbon atoms, an alkenyl or alkynyl radical of up to 6 carbon atoms or a phenylalkyl radical of up to 8 carbon atoms, and Z is as above. The reaction may be carried out in a solvent, for example ether or tetrahydrofuran, and may be accelerated or completed by the application of heat.

h. for a compound in which $R^2$ is a radical of the formula:

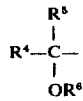

in which $R^4$, $R^5$ and $R^6$ are all hydrogen atoms, reducing a compound of the formula:

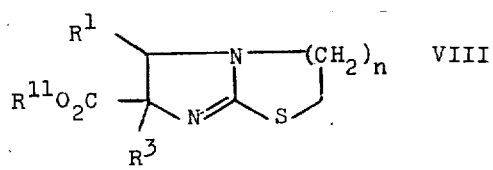

in which $R^1$, $R^3$, $R^{11}$ and n have the meanings stated above, with a complex hydride reducing agent, for example lithium aluminium hydride. The reaction may be carried out in a solvent, for example ether or tetrahydrofuran, and may be accelerated or completed by the application of heat.

i. for a compound in which $R^2$ is a radical of the formula $R^4CO$ and $R^3$ is an alkyl radical of 1 or 2 carbon atoms, reaction of an anion of the formula:

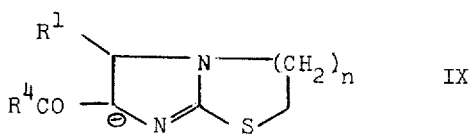

in which $R^1$, $R^4$ and n have the meanings stated in claim 1, with a compound of the formula $R^{13}Z$ in which $R^{13}$ is an alkyl radical of 1 or 2 carbon atoms and Z is as above. The reaction may be carried out in a solvent such as dimethylformamide or tetrahydrofuran and is preferably performed in a nitrogen atmosphere.

The imidazo heterocyclic derivative so manufactured may be produced as a mixture of stereoisomers and/or as a mixture of optical isomers. When an individual isomer is required, it may be obtained by separation of the mixture of isomers by conventional means.

The starting material of the formula III for use in process (a) may be prepared by reaction of a compound of the formula:

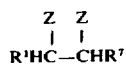

(prepared from the corresponding unsaturated ketone), with a base, for example triethylamine or sodium acetate, in a solvent, for example ethyl acetate. The reaction may conveniently be carried out in situ before reaction of the product with a compound of the formula IV.

The starting material of the formula V for use in process (b) may be prepared by reaction of a compound of the formula:

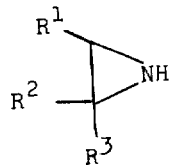

with ammonium thiocyanate or thiourea.

The starting material of the formula VIII for use in process (g) and (h) may be prepared by reaction of a compound of the formula:

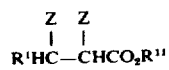

(itself prepared from the corresponding unsaturated ester), with a base, for example triethylamine, in a solvent, for example ethyl acetate, followed by reaction of the product, the compound of the formula:

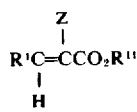

with a compound of the formula:

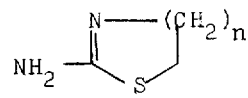

in a manner exactly analogous to that described in process (a).

The compounds of the invention possess antidepressant properties in warm-blooded animals as demonstrated by the reversal of reserpine-induced hypothermia in mice, a standard test which is the one primarily used in the art for establishing relative antidepressant activity in a series of related compounds (Askew. Life Sciences, 1963, volume 2, page 725).

The test, known as the RHL test, is carried out as follows:

Each member of various groups of 6 mice is given reserpine (2 mg. of base per kg. bodyweight, given subcutaneously, as the phosphate). Seventeen hours later, the gastric temperature ($T_0$) of each mouse is recorded by means of an orally-inserted probe coupled to an electric thermometer, calibrated in degrees Centigrade and which can be read to 0.05°C. Immediately after the temperature measurement, the mice are dosed orally with the test compound or with saline (controls), each mouse in a group of 6 being given the same substance, and the gastric temperatures are again recorded after 4 hours ($T_4$). The effect of the test compound is computed from the mean cumulative rise in temperature after 4 hours. The mean cumulative difference in temperature (C) is thus defined as the mean, calculated from the results obtained in 6 mice, of the sum:

$$T_4 - T_0$$

The effect of the test compound is related to the dose, and, using suitable doses, a dose of compound can be defined which gives a mean cumulative rise in temperature of 3°C. greater than that of control mice. This dose is called the $ED_3$ and recorded in mg. per kg. bodyweight.

All the compounds exemplified in this specification are active on the RHL test at a dose ($ED_3$) of equal to or less than 100 mg./kg. while at the same dose showing no obvious signs of toxicity. The $LD_{50}$ for a number of compounds, was determined by dosing groups of 4 mice orally and recording deaths within 24 hours. The $LD_{50}/ED_3$ ratio for those compounds so tested ranges from 70 to over 3,000.

According to a further feature of the invention, there is provided a pharmaceutical composition which comprises as active ingredient imidazo heterocyclic derivative of the invention, in association with a nontoxic, pharmaceutically-acceptable diluent or carrier therefor.

The pharmaceutical composition may be, for example, in a form suitable for oral or parenteral administration, for which purposes it may be formulated by means known to the art into the form of, for example, tablets, capsules, aqueous or oily solutions or suspensions, emulsions, sterile injectable aqueous or oily solutions or suspensions, or dispersible powders.

The pharmaceutical composition of the invention may also contain, in addition to the imidazo heterocyclic derivative or salt thereof, one or more known drugs selected from neuroleptic-sedative agents, for example chlorpromazine, prochlorperazine, trifluoperazine and haloperidol; other sedative drugs and tranquillizers, for example chlordiazepoxide, phenobarbitone and amylobarbitone; β-adrenergic blocking agents, for example propranolol; drugs used in the treatment of Parkinson's disease, for example benzhexol; and other antidepressant drugs, for example imipramine, desipramine, amitriptyline, nortriptyline, drugs of the amphetamine type and monoamineoxidase inhibitors, for example phenelzine and mebanazine.

A preferred pharmaceutical composition of the invention is one suitable for oral administration in unit dosage form, for example tablets and capsules, which contain between 20 and 200 mg. of active ingredient, or one suitable for intravenous or intramuscular injection, for example a sterile aqueous solution containing between 0.5 and 4% w/w of active ingredient.

The pharmaceutical composition of the invention will normally be administered to man for the treatment or prophylaxis of depressive illness, at such a dose that each patient receives a total oral dose of between 50 and 400 mg. of active ingredient per day, or a total intravenous or intramuscular dose of between 10 and 80 mg. per day, the composition being administered 2 to 3 times per day.

The invention is illustrated, but not limited, by the following Examples in which Examples 23, 25, 26, 27, 28 and 40 describe the preparation of starting materials:

EXAMPLE 1

A solution of the dibromo derivative (12.3 g.) obtained by bromination of trans-4-phenylbut-3-en-2-one, 2-aminothiazoline (4.1 g.) and triethylamine (8.2 g.) in ethyl acetate (50 ml.) is heated under reflux for 2 hours. The mixture is cooled, triethylamine hydrobromide is filtered off and the filtrate is evaporated to dryness under reduced pressure. The residue is partitioned between ether and aqueous hydrochloric acid (2.5N) and the aqueous layer is made alkaline with aqueous sodium hydroxide solution (5N) and extracted with ether. The ether extract is evaporated under reduced pressure and the residue is recrystallised from petroleum ether (b.p. 80°–100°C.) to give trans-6-acetyl-5-phenyl-2,3,5,6-tetrahydroimidazo[2,1-b]thiazole, m.p. 83°–89°C.

EXAMPLE 2

Sodium borohydride (0.3 g.) is added to a solution of trans-6-acetyl-5-phenyl-2,3,5,6-tetrahydroimidazo[2,1-b]-thiazole (0.25 g.) in ethanol (25 ml.) and the mixture is stirred for 18 hours at room temperature. The ethanol is removed by evaporation under reduced pressure and the residue is partitioned between ethyl acetate and water. The residue obtained by evaporation of the ethyl acetate under reduced presssure is recrystallised from a mixture of acetone and petroleum ether (b.p. 60°–80°C.) to give trans-6-(1-hydroxyethyl)-5-phenyl-2,3,5,6-tetrahydroimidazo[2,1-b]thiazole, m.p. 94°–96°C.

EXAMPLE 3

The process described in Example 1 is repeated except that an equivalent amount of the dibromo derivative obtained by bromination of trans-4-(3,4-dichlorophenyl)but-3-en-2-one is used in place of the dibromo derivative obtained by bromination of trans-4-phenylbuten-2-one and the reaction is carried out under nitrogen. There is thus obtained trans-6-acetyl-5-(3,4-dichlorophenyl)-2,3,5,6-tetrahydroimidazo[2,1-b]thiazole as a viscous oil.

EXAMPLE 4

Sodium borohydride (1.5 g.) and sodium bicarbonate (1.0 g.) are added to a solution of trans-6-acetyl-5-(3,4-dichlorophenyl)-2,3,5,6-tetrahydroimidazo[2,1-b]thiazole in ethanol (50 ml.) and the mixture is stirred for 18 hours at room temperature. The ethanol is removed by evaporation under reduced pressure and the residue is partitioned between ether and aqueous hydrochloric acid (2N). The aqueous phase is made alkaline with aqueous sodium hydroxide (2N) and is then extracted with ethyl acetate. The residue obtained by evaporation of the ethyl acetate under reduced pressure is recrystallised from petroleum ether (b.p. 60°–80°C.) to give trans-5-(3,4-dichlorophenyl)-6-(1-hydroxyethyl)-2,3,5,6-tetrahydroimidazo[2,1-b]thiazole, m.p. 175°–185°C.

EXAMPLE 5

The product described in Example 3 is recrystallised from acetone to give trans-6-acetyl-5-(3,4-dichlorophenyl)-2,3,5,6-tetrahydroimidazo[2,1-b]thiazole, m.p. 115°–117°C.

EXAMPLE 6

The unrecrystallised product described in Example 2 is successively recrystallised from ethyl acetate and then acetone to give trans-6-(threo-1-hydroxyethyl)-5-phenyl-2,3,5,6-tetrahydroimidazo[2,1-b]thiazole, m.p. 149°–151°C. (n.m.r.ind$_6$DMSO:$J_{AB}$ 6.0 c.p.s., methyl doublet 1.02$\delta$). Evaporation of the ethyl acetate filtrate and recrystallisation of the residue from acetone gives trans-6-(erythro-1-hydroxyethyl)-5-phenyl-2,3,5,6-tetrahydroimidazo[2,1-b]thiazole, m.p. 145°C. (n.m.r.in d$_6$DMSO:$J_{AB}$ 3.8 c.p.s., methyl doublet 1.05$\delta$).

The unrecrystallised product described in Example 4 is successively recrystallised from acetone (twice) and then ethanol to give trans-5-(3,4-dichlorophenyl)-6-(threo-1-hydroxyethyl)-2,3,5,6-tetrahydroimidazo[2,1-b]thiazole, m.p. 190°–195°C. (n.m.r. in d$_6$DMSO:$J_{AB}$ 6.0 c.p.s., methyl doublet 1.08$\delta$). The acetone filtrate from the initial crystallisation is evaporated to dryness and the residue is recrystallised from ethanol to give trans-5-(3,4-dichlorophenyl)-6-(erythro-1-hydroxyethyl)-2,3,5,6-tetrahydroimidazo[2,1-b]thiazole, m.p. 163°–164°C. (n.m.r.in d$_6$DMSO:$J_{AB}$ 3.2 c.p.s., methyl doublet 1.08$\delta$).

EXAMPLE 7

The process described in Example 1 is repeated using an equivalent amount of the appropriately substituted 3,4-dibromobutan-2-one (conveniently prepared by bromination of the corresponding trans-but-3-en-2-one) in place of 3,4-dibromo-4-phenylbutan-2-one, and in an atmosphere of nitrogen, and there are thus obtained the compounds in the following table. The R$_f$ values are those on silica GF plates developed with ethyl acetate, a blue spot being obtained on spraying with potassium chloroplatinate solution.

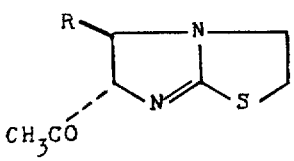

| R | Reaction temperature | $R_f$ | Footnote |
|---|---|---|---|
| 2-Furyl | 20°C | 0.3 | 1 |
| 2-Thienyl | 20°C | 0.4 | 1 |
| 2,6-Dichlorophenyl | reflux | — | 2 |
| 2-Pyridyl | 20°C | 0.1 | 1 |
| 4-Methoxyphenyl | reflux | 0.3 | — |
| 1-Naphthyl | reflux | 0.3 | — |
| 4-Bromophenyl | reflux | 0.4 | 3 |
| 4-Nitrophenyl | reflux | 0.4 | 4 |
| 2-Tolyl | reflux | 0.3 | — |
| 4-Isopropylphenyl | reflux | 0.4 | — |
| 4-Dimethylaminophenyl | reflux | 0.25 | — |
| 4-Methylthiophenyl | reflux | 0.5 | 5 |
| 4-Fluorophenyl | reflux | 0.3 | — |
| 4-Chlorophenyl | reflux | 0.3 | — |
| 2-Methoxyphenyl | reflux | 0.3 | 6 |
| 3-Methoxyphenyl | reflux | 0.4 | 6 |
| 2-Chlorophenyl | reflux | 0.3 | 6 |
| 3-Chlorophenyl | reflux | 0.3 | 6 |
| 4-Acetamidophenyl | reflux | — | 7 |

Footnotes

1. The brominated ketone is first added as a solution in methylene dichloride at 0°C.
2. M.p. 146–147°C. on recrystallisation from acetone.
3. The brominated ketone is first added gradually with stirring, and the mixture stirred for 2 hours at 20°C. before reflux.
4. The brominated ketone is added dropwise over the 1 hour reflux period to a solution of 2-aminothiazoline. No triethylamine is present.
5. The brominated ketone is stirred with triethylamine for 20 minutes before the 2-aminothiazoline is added.
6. A solution of the brominated ketone is first added dropwise to the refluxing solution of triethylamine and 2-aminothiazoline.
7. A solution of the brominated ketone (1.0 g.) in tetrahydrofuran is added dropwise to a refluxing solution of 2-aminothiazoline (0.84 g.) in tetrahydrofuran as sole solvent. No triethylamine is present. The solvent is evaporated, the residue partitioned between ethyl acetate and water, and the organic phase extracted with cold NHCl. The acid layer is basified, extracted with ethyl acetate, and this extract is evaporated. The residue is recrystallised from acetone to give the product, m.p. 154–162°C.

Various substituted 4-phenyl-but-3-en-2-ones used as starting materials may be obtained as follows:- A 7 percent sodium hydroxide solution (50 ml.) is added dropwise with stirring to a solution of 3,4-dichlorobenzaldehyde (100 g.) in acetone (1.5 l.), which has been cooled to < 5°C. in an ice-bath. The mixture is then stirred at 20°C. for 3 hours. 10 percent Hydrochloric acid is added until the mixture is acidic, water and ethyl acetate are then added and the organic phase is separated. The extract is evaporated and the residue is distilled, the fraction b.p. 142°–146°C./0.20 mm. being collected. The distillate solidifies and recrystallisation from petroleum ether (b.p. 60°–80°C.) gives trans-4-(3,4-dichlorophenyl)-but-3-en-2-one, m.p. 58–59°C.

The above process is repeated except 2,6-dichlorobenzaldehyde is used in place of its 3,4-isomer and that 10% sodium hydroxide is used in place of 7 percent sodium hydroxide. Stirring at 20°C. is carried out for 40 hours. Distillation of the ethyl acetate extract furnishes trans-4-(2,6-dichlorophenyl)-but-3-en-2-one, b.p. 110°C./0.05 mm. A solution of 0.5 percent w/v sodium hydroxide (200 ml.) is added gradually to a ice-cooled solution of 4-acetamidobenzaldehyde (20.0 g.) in acetone (400 ml.), keeping the temperature at <5°C. The mixture is stirred for 2 hours at 5°C and then for 1 hour at 20°C. It is cooled to 0°C. and filtration of the precipitate followed by recrystallisation from ethanol gives trans-4-(4-acetamidophenyl)-but-3-en-2-one, m.p. 184–193°C.

To a solution of 4-methylthiobenzaldehyde (6.0 g.) in acetone (100 ml.) at 0°–5°C., is added 1N.NaOH solution (5 ml.) and the mixture is stirred for 2 hours at 20°C. It is then acidified with dilute HCl, water (100 ml.) is added and the mixture extracted with ether (2×100 ml.). The combined organic layers are washed with water and evaporated to dryness. The residue is crystallised from ethyl acetate/petroleum ether (b.p. 80°–100°C.) to give trans-4-(4-methylthiophenyl)-but-3-en-2-one, m.p. 78°–79°C.

EXAMPLE 8

A mixture of crude trans-6-acetyl-5-(2-furyl)-2,3,5,6-tetrahydroimidazo[2,1-b]thiazole (23 g.) and sodium bicarbonate (5.0 g.) in ethanol (200 ml.) is stirred under nitrogen for 20 minutes. The mixture is cooled to 0°C. and sodium borohydride (10.0 g.) is added portionwise over 1 hour, and the mixture is stirred for a further 2 hours at 20°C. The mixture is filtered, the filtrate is evaporated to dryness and the residue is partitioned between ethyl acetate and water. Evaporation of the organic phase gives a red oil which on trituration with ether and recrystallisation of the resulting solid from ethanol gives trans-5-(2-furyl)-6-(threo-1-hydroxyethyl)-2,3,5,6-tetrahydroimidazo[2,1-b]thiazole, m.p. 178°–180°C. (n.m.r. in $d_6$DMSO:$J_{AB}$ 6.0 c.p.s., methyl doublet, 0.96 δ).

EXAMPLE 9

The process described in Example 8 is repeated using an equivalent amount of the appropriately substituted 2,3,5,6-tetrahydroimidazo[2,1-b]thiazole in place of trans-6-acetyl-5-(2-furyl)-2,3,5,6-tetrahydroimidazo[2,1-b]thiazole as starting material and in an atmosphere of nitrogen, and there are thus obtained the following compounds, either as a mixture of erythro and threo isomers, or as the separated isomers where indicated. The n.m.r. spectra are obtained in $d_6$DMSO.

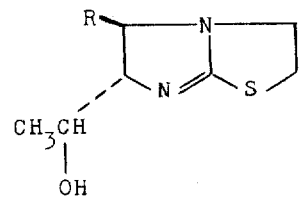

| R | Reaction time (hrs.) | Isomer | m.p.°C. | Recrystallisation solvent | Methyl doublet δ | $J_{AB}$ c.p.s. | Footnote |
|---|---|---|---|---|---|---|---|
| 2-Thienyl | 2 | threo | 160–162 | acetone/ether then acetone | 1.04 | 6.0 | 1 |
|  |  | erythro | 158–159 | acetone | 1.08 | 3.8 | 2 |
| 2,6-Dichlorophenyl | 3 | threo | 197–213 | acetone | 0.95 | 5.6 |  |
| 2-Pyridyl | 2 | mixture | 125–150 | acetone/ether |  |  | 1 |
|  |  | threo | 156 | acetone | 1.02 | 6.0 | 3 |

| R | Reaction time (hrs.) | Isomer | m.p. °C. | Recrystall- isation solvent | Methyl doublet δ | $J_{AB}$ c.p.s. | Footnote |
|---|---|---|---|---|---|---|---|
| | | erythro | 146 | acetone | 1.05 | 3.8 | 4 |
| 4-Methoxyphenyl | 16 | mixture | 165–175 | | | | 1, 5 |
| | | threo | 186–187 | ethyl acetate | 1.04 | 6.2 | 3 |
| 1-Naphthyl | 16 | mixture | 186–209 | acetone | | | 1, 6 |
| 4-Bromophenyl | 48 | mixture | 132–140 | ethyl acetate | | | 1 |
| | | threo | 141–145 | ethyl acetate | 1.06 | 6.2 | 3 |
| 4-Nitrophenyl | 16 | mixture | 220–224 | ethyl acetate | | | 1, 6 |
| 2-Tolyl | 48 | mixture | 138–144 | acetone | | | 1 |
| 4-Isopropylphenyl | 48 | mixture | 154–162 | acetone | | | 1 |
| 4-Dimethylaminophenyl | 48 | threo | 170–180 | acetone | 0.99 | 5.8 | 1 |
| | | erythro | 160–165 | acetone | 1.08 | 4.0 | 7 |
| 4-Acetylphenyl | 0.2 | mixture | 178–190 | ethyl acetate/ methanol | | | 8 |
| 4-Methylthio | 0.2 | mixture | 145–160 | ethyl acetate/ petroleum ether (b.p.80–100°C) | | | 8 |
| 4-Fluorophenyl | 16 | mixture | 145–153 | ethyl acetate | | | 1, 6 |
| | | threo | 158–161 | acetone | 1.04 | 6.0 | 3 |
| | | erythro | 138–149 | acetone | 1.10 | 3.6 | 4 |
| 4-Chlorophenyl | 16 | threo | 141–147 | acetone | 1.07 | 6.2 | 1 |
| 2-Methoxyphenyl | 16 | mixture | 135–140 | acetone | | | 1 |
| 3-Methoxyphenyl | 16 | threo | 143–145 | acetone | 1.06 | 6.0 | 1, 6 |
| 2-Chlorophenyl | 16 | mixture | 136–141 | acetone | | | 1 |
| 3-Chlorophenyl | 16 | threo | 129–133 | acetone | 0.89 | 6.2 | 1, 6 |
| | | erythro | 110–120 | ethyl acetate | 1.09 | 3.2 | 9 |
| 4-Acetamidophenyl | 16 | threo | 222–231 | acetone | 1.05 | 6.0 | 10 |

Footnotes

1. The ethyl acetate solution of the product is extracted with N.HCl, the acid basified and the resulting misture reextracted with ethyl acetate.
2. Product isolated by recrystallisation of the residue obtained by evaporation of the acetone/ether mother liquors of the threo isomer.
3. Product obtained by recrystallisation of the mixture of threo and erythro isomers.
4. Product isolated by recrystallisation of the residue obtained by evaporation of the mother liquors of the mixed isomers.
5. Mixture of isomers obtained by evaporation of ethyl acetate extract to small volume.
6. Charcoal used during recrystallisation.
7. Threo isomer obtained by evaporation to small bulk of mother liquor from crystallisation of erythro isomer.
8. Reaction mixture is worked up by addition of N.HCl(100 ml.) and ether (100 ml.) and separation of the aqueous phrase which is then basified and extracted with chloroform.
9. Isolated by column chromatography on silica, using ethyl acetate/methanol as eluant, of the residue obtained by evaporation of the mother liquors of the theor isomer.
10. No sodium bicarbonate is used.

EXAMPLE 10

A solution of trans-6-(threo-1-hydroxyethyl)-5-phenyl-2,3,5,6-tetrahydroimidazo[2,1-b]thiazole (0.3 g.) and acetic anhydride (0.11 g.) in pyridine (1.0 ml.) is heated on the steam bath for 1 hour. The pyridine is evaporated and ice/water is added. The pH of the mixture is brought to 10 with N.sodium hyroxide solution and the resulting solid is filtered. It is recrystallised from petroleum ether (b.p. 60°–80°C.) to give trans-6-(threo-1-acetoxyethyl)-5-phenyl-2,3,5,6-tetrahydroimidazo[2,1-b]thiazole, m.p. 128°–130°C.

The above process is repeated using an equivalent amount of the corresponding erythro isomer as starting material and there is thus obtained trans-6-(erythro-1-acetoxyethyl)-5-phenyl-2,3,5,6-tetrahydroimidazo[2,1-b]thiazole, m.p. 106°–108°C. on recrystallisation from petroleum ether (b.p. 60°–80°C.).

EXAMPLE 11

A solution of trans-5-(4-chlorophenyl)-6-threo-1-hydroxyethyl)-2,3,5,6-tetrahydroimidazo[2,1-b]thiazole (0.4 g.), acetyl chloride (0.14 ml.) and triethylamine (0.20 ml.) in dioxan (5 ml.) is heated on the steam bath for 1 hour. After removal of the dioxan by evaporation, ice water and ethyl acetate are added to the residue and the ethyl acetate is then evaporated to dryness to give trans-6-(threo-1-acetoxyethyl)-5-(4-chlorophenyl)-2,3,5,6-tetrahydroimidazo[2,1-b]thiazole as a gum.[n.m.r. in $CDCl_3$:7.25δ (4H,s); 5.02δ (1H,m); 4.3δ (2H,m); 4.5δ (2H,m): 3.1δ (2H,m); 1.88δ (3H,s); 1.3δ (3H,d)].

The above process is repeated using an equivalent amount of benzoyl chloride in place of acetyl chloride. There is thus obtained trans-6-(threo-1-benzoyloxyethyl)-5-(4-chlorophenyl)-2,3,5,6-tetrahydroimidazo[2,1-b]thiazole, m.p. 143°–145°C. on recrystallisation from cyclohexane.

EXAMPLE 12

A solution of 3,4-dibromobutan-2-one [prepared by gradually adding bromine (1.0 ml.) in petroleum ether (b.p. 40°–60°C.) (10 ml.) with stirring to a solution of methyl vinyl ketone (1.4 g.) in petroleum ether (b.p. 40°–60°C.) (10 ml.) below 0°C.], in ethyl acetate (20 ml.) is added gradually under nitrogen to a well stirred solution of 2-aminothiazoline (2.0 g.) and triethylamine (5.6 ml.) in ethyl acetate (20 ml.), the temperature being kept below 0°C. The mixture is stirred at 20°C. for 2.5 hours, filtered and the filtrate evaporated to dryness to give 6-acetyl-2,3,5,6-tetrahydroimidazo[2,1-b]thiazole, ($R_f$ 0.1 on a silica GF plate developed with ethyl acetate and giving a mauve spot with potassium chloroplatinate spray).

EXAMPLE 13

The process described in Example 12 is repeated using an equivalent amount of the appropriate dibromo ketone in place of 3,4-dibromobutan-2-one as starting material, and there are thus obtained the following compounds:

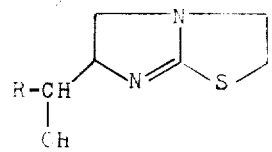

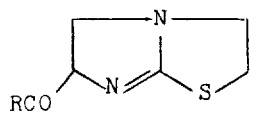

| R | Reaction time (hrs.) | Isomer | m.p.°C. | Recrystallisation solvent | Footnote |
|---|---|---|---|---|---|
| Methyl | 16 | threo | 140 | acetone | 1 |
| Phenyl | 16 | mixture | 125–130 | acetone | |
| 2-Thienyl | 1 | mixture | 135–145 | acetone | |
| 4-Chlorophenyl | 1 | mixture | 158–169 | ethyl acetate | 2 |

Footnotes
1. The residue obtained by evaporation of the ethyl acetate solution is chromatographed on a silica column using chloroform/ethanol as eluant. The threo isomer has the methyl doublet at 1.126δ in d₆DMSO.
2. The residue obtained by evaporation of the ethyl acetate solution is chromatographed on a silica column using chloroform/methanol as eluant.

| R | Reaction temperature | Reaction time (hrs) | m.p. °C. | Footnote |
|---|---|---|---|---|
| Phenyl | 20°C. | 1 | — | 2 |
| 2-Thienyl | reflux | 1 | 210–213 | 1 |
| 4-Chlorophenyl | reflux | 1 | 225 | 1 |

Footnotes
1. The m.p. given is that of the hydrochloride salt, prepared by addition of 2N.HCl to the filtered reaction mixture and recrystallisation of the resulting precipitate from methanol.
2. R_f 0.4 on a silica GF plate developed with ethyl acetate.

EXAMPLE 14

The process described in Example 8 is repeated using an equivalent amount of the appropriately substituted 2,3,5,6-tetrahydroimidazo[2,1-b]thiazole in place of trans-6-acetyl-5-(2-furyl)-2,3,5,6-tetrahydroimidazo[2,1-b]thiazole as starting material, in an atmosphere of nitrogen and using water in place of HCl in the work up, and there are thus obtained the following compounds, either as a mixture of erythro and threo isomers, or as the separated isomers, where indicated.

EXAMPLE 15

The process described in Example 12 is repeated, using an equivalent amount of the appropriately substituted dibromo ketone (prepared by bromination of the corresponding α,β-unsaturated ketone) in place of 3,4-dibromobutan-2-one as starting material, and there are thus obtained the following compounds:-

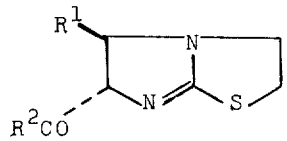

| R¹ | R² | Reaction temperature | Reaction time (hrs) | m.p.°C. | Recrystallisation solvent | Footnote |
|---|---|---|---|---|---|---|
| Phenyl | phenyl | reflux | 1 | 129 | acetone | 1 |
| Phenyl | ethyl | reflux | 1 | — | — | 1, 2 |

Footnotes
1. The ethyl acetate solution is washed with 2N.HCL, the acid solution basified, extracted with ether and the ether evaporated.
2. The product has R_f 0.4 on a silica GF plate using toluene/acetone/ammonia s.g.0.88 66:33:1 as developing solvent.

EXAMPLE 16

The process described in Example 8 is repeated using water in place of HCl in the work up, and using an equivalent amount of the appropriately substituted 2,3,5,6-tetrahydroimidazo[2,1-b]thiazole in place of trans-6-acetyl-5-(2-furyl)-2,3,5,6-tetrahydroimidazo[2,1-b]thiazole as starting material, and there are thus obtained the following compounds, either as a mixture of erythro and threo isomers, or as the separated isomers, where indicated.

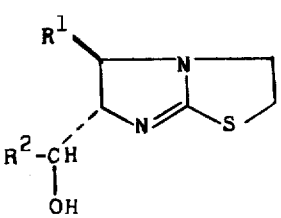

| R¹ | R² | Reaction time(hrs) | Isomer | m.p.°C. | Recrystallisation solvent | Footnote |
|---|---|---|---|---|---|---|
| Phenyl | phenyl | 1 | mixture | 180–220 | ethanol | |

-continued

| R¹ | R² | Reaction time(hrs) | Isomer | m.p.°C. | Recrystallisation solvent | Footnote |
|---|---|---|---|---|---|---|
|  |  |  | threo | 215 | ethanol | 1 |
|  |  |  | erythro | 182 | acetone/ethanol | 2 |
| Phenyl | ethyl | 72 | threo | 175–182 | acetone | 3, 5 |
|  |  |  | erythro | 176–177 | acetone | 4, 5 |

Footnotes
1. N.m.r. in d₆ pyridine J_{AB} = 5 c.p.s.
2. Obtained by recrystallisation of residue from threo mother liquors.
3. N.m.r. in d₆DMSO CH₃ triplet 0.798; J_{AB} 6.0 c.p.s.
4. N.m.r. in d₆DMSO CH₃ triplet 0.818; J_{AB} 3.0 c.p.s.
5. Isomer separated on 1 mm. silica plates using toluene/acetone/ammonia s.g. 0.88 66:33:1 as developing solvent.

EXAMPLE 17

Triethylamine (5.8 ml.) is added under nitrogen to a refluxing solution of 2-amino-5,6-dihydro-4H-1,3-thiazine (4.12 g.) and 3-bromo-4-phenyl-3-buten-2-one (4.7 g.) in acetonitrile (50 ml.) and heating is continued for a further 1.75 hours. The cooled mixture is filtered, the filtrate extracted with cold 2N.HCl and the acid extract is basified with cold 2N.sodium hydroxide. The resulting mixture is extracted with ethyl acetate and the organic extract is evaporated to dryness to give trans-7-acetyl-6-phenyl-2,3,6,7-tetrahydro-4H-imidazo[2,1-b](1,3)thiazine, having an R_f on a silica GF plate eluted with ethyl acetate of 0.2.

EXAMPLE 18

The process described in Example 2 is repeated except that an equivalent amount of trans-7-acetyl-6-phenyl -2,3,6,7-tetrahydro-4H-imidazo[2,1-b](1,3)thiazine is used as starting material in place of trans-6-acetyl-5-phenyl-2,3,5,6-tetrahydroimidazo[2,1-b]thiazole. The residue obtained by evaporation of the ethyl acetate extract is chromatographed on 1 mm. thick silica plates developed with ethyl acetate/ethanol/triethylamine 100:40:3. The major band is isolated by extraction with methanol and recrystallised from acetone to give trans-7-(threo-1-hydroxyethyl)-6-phenyl-2,3,6,7-tetrahydro-4H-imidazo[2,1-b](1,3)thiazine, m.p. 125°–132°C.

EXAMPLE 19

Triethylamine (2.1 ml.) is added under nitrogen to a suspension of 2-amino-5,6-dihydro-4H-1,3-thiazine hydrochloride (0.99 g.) and 3,4-dibromo-4-(3,4-dichlorophenyl)-butan-2-one (1.88 g.) (prepared by bromination of the corresponding α,β-unsaturated ketone) in acetonitrile (50 ml.) and the mixture is heated to reflux for 1 hour. The intermediate ketone which is formed is not isolated, but the reaction mixture is cooled, sodium carbonate (2.0 g.) is added and stirring is continued at 20°C. for a further 0.5 hour after which time sodium borohydride (1.2 g.) is added. The mixture is stirred at 20°C. for 18 hours, the ethanol is removed by evaporation and the residue is partitioned between ethyl acetate and HCl. The acid extract is basified, extracted with ethyl acetate and the residue from this extract chromatographed on 1 mm. silica plates using ethyl acetate/ammonia s.g. 0.88 100:1 as developing solvent. The major band is isolated by extraction with chloroform and is recrystallised from acetone to give trans-6-(3,4-dichlorophenyl)-7-(1-hydroxyethyl)-2,3,6,7-tetrahydro-4H-imidazo[2,1-b](1,3)thiazine, m.p. 212°–215°C. as a single isomer.

EXAMPLE 20

The process described in Example 19 is repeated using an equivalent amount of 3-bromo-4-(4-dimethylaminophenyl)-but-3-en-2-one as starting material in place of 3,4-dibromo-4-(3,4-dichlorophenyl)-butan-2-one, and using 2 molecular equivalents of triethylamine rather than 3 as in Example 19. Heating is continued for 4.5 hours. The crude product is isolated by chromatography on 1 mm. silica plates developed with ethyl acetate/ethanol/triethylamine 100:40:3 and the upper band isolated by extraction with methanol. Trituration of the product with acetone gives trans-6-(4-dimethylaminophenyl)-7-(threo-1-hydroxyethyl)-2,3,6,7-tetrahydro-4H-imidazo[2,1-b](1,3)thiazine, m.p. 225°C.

EXAMPLE 21

A solution of trans-6-acetyl-5-(3,4-dichlorophenyl)-2,3,5,6-tetrahydroimidazo[2,1-b]thiazole (0.63 g.) in dry tetrahydrofuran (50 ml.) is rapidly added under nitrogen to a Grignard reagent prepared from magnesium (0.14 g.) and methyl iodide (0.38 ml.) in ether. The mixture is stirred at 20°C. for 1 hour, the solvent is removed by evaporation and the residue is partitioned between ethyl acetate and 0.5N.sodium hydroxide. The ethyl acetate is evaporated and the residue is chromatographed on a column of silica using ethyl acetate/methanol as eluant to give trans-6-(1-hydroxy-1-methylethyl)-5-(3,4-dichlorophenyl)-2,3,5,6-tetrahydroimidazo[2,1-b]thiazole, m.p. 126°–128°C. on recrystallisation from petroleum ether (b.p. 80°–100°C.)/acetone.

EXAMPLE 22

The process described in Example 21 is repeated using an equivalent amount of trans-6-acetyl-5-phenyl-2,3,5,6-tetrahydroimidazo[2,1-b]thiazole as starting material in place of trans-6-acetyl-5-(3,4-dichlorophenyl)-2,3,5,6-tetrahydroimidazo[2,1-b]thiazole, an equivalent amount of a Grignard reagent or alkyl lithium in place of methyl magnesium iodide as starting material where appropriate, and without the use of column chromatography, and the following compounds as single diastereoisomers are thus obtained.

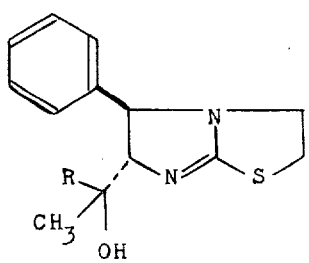

| R | Reaction time (hrs) | m.p.°C. | Recrystall- isation solvent | Methyl singletδ | n.m.r. solvent | Foot- note |
|---|---|---|---|---|---|---|
| Methyl | 16 | 105–108 | acetone | | | 1 |
| Phenyl | 16 | 160–163 | acetone | 1.38 | CDCl₃ | 2 |
| n-Propyl | 16 | 93–103 | acetone | 0.98 | CDCl₃ | 3 |
| n-Butyl | 3 | 152–156 | cyclohexane | 0.95 | CDCl₃ | 4 |

Footnotes
1. Grignard reagent prepared from Mg and methyl iodide.
2. Grignard reagent prepared from Mg and bromobenzene.
3. Grignard reagent prepared from Mg and n-propyl bromide.
4. Reaction carried out by n-butyl lithium in hexane being added to the ketone in ether. Reaction worked up with water and the residue from the organic phase is chromatographed on 1 mm. silica plates using toluene/acetone/s.g. 0.88 ammonia 66:33:1.

EXAMPLE 23

A mixture of 2-aminothiazoline (10. g.), triethylamine (25.0 ml.) and ethyl 2,3-dibromo-3-phenylpropionate in ethyl acetate (40 ml.) is heated to reflux under nitrogen for 20 hours. The cooled mixture is filtered and the filtrate washed well with water, and then with N.HCl. The acid extract is basified with 2N.sodium hydroxide and extracted with ethyl acetate. The ethyl acetate is removed by evaporation and the residue is chromatographed on a silica column using ethyl acetate as eluant to give cis-6-ethoxycarbonyl-5-phenyl-2,3,5,6-tetrahydroimidazo[2,1-b]thiazole, m.p. 99°C. on recrystallisation from acetone, and trans-6-ethoxycarbonyl-5-phenyl-2,3,5,6-tetrahydroimidazo[2,1-b]thiazole, m.p. 98°–102°C. on recrystallisation from acetone.

After rapid addition of 2-aminothiazoline (154 g.) in ethyl acetate (3 l.) to a solution of ethyl 3-(3,4-dichlorophenyl)-2,3-dibromopropionate (555 g.) in ethyl acetate (2 l.) under nitrogen, triethylamine (385 ml.) is immediately added over 10 minutes. The mixture is stirred at 20°C. for 1 hour then heated to reflux under nitrogen for 12 hours. The cooled mixture is filtered, and the filtrate washed three times with water. N.HCl (1.5 l.) is added to the organic layer with vigorous stirring, and on cooling below 10°C. a precipitate is formed. It is filtered and recrystallised from ethanol to give cis-5-(3,4-dichlorophenyl)-6-ethoxycarbonyl-2,3,5,6-tetrahydroimidazo[2,1-b]thiazole hydrochloride, m.p. 226°–230°C. Treatment of this salt with alkali gives the free base, m.p. 125°–130°C. on recrystallisation from acetone/petroleum ether (b.p. 80°–100°C.)

The mother liquors from the precipitation of the above cis-isomer are separated, the aqueous phase is cooled to less than 10°C., basified with 4N.sodium hydroxide and extracted with ethyl acetate twice. The combined extracts are evaporated to dryness and the residue recrystallised from acetone/petroleum ether (b.p. 80°–100°C.) to give trans-5-(3,4-dichlorophenyl)-6-ethoxycarbonyl-2,3,5,6-tetrahydroimidazo[2,1-b]thiazole, m.p. 65°–68°C.

EXAMPLE 24

The process described in Example 21 is repeated using an equivalent amount of cis- or trans-6-ethoxycarbonyl-5-phenyl-2,3,5,6-tetrahydroimidazo[2,1-b]thiazole as starting material in place of trans-6-acetyl-5-(3,4-dichlorophenyl)-2,3,5,6-tetrahydroimidazo[2,1-b]thiazole, twice the equivalent amount of an appropriate Grignard reagent in place of methyl magnesium iodide, and without the use of column chromatography, and the following compounds are thus obtained.

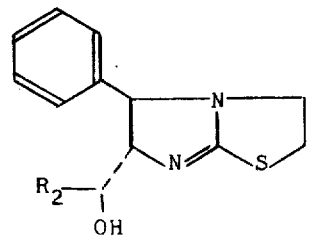

| R | Reaction time (hrs) | Isomer | m.p.°C. | Recrystallisation solvent | Foot- note |
|---|---|---|---|---|---|
| methyl | 4 | cis | 151–152 | acetone/petroleum ether(b.p.80–100°C.) | 1 |
| Methyl | 4 | trans | 106–108 | acetone | 1 |
| Ethyl | 2 | cis | 135–140 | acetone | 2 |
| Ethyl | 2 | trans | 232–245 | ethanol/ethyl acetate | 2,3 |
| n-Propyl | 2 | trans | 230–235 | ethanol | 4,5 |
| Vinyl | 3 | trans | 140–144 | acetone | 6 |
| Benzyl | 3 | trans | 184–187 | ethanol | 7 |

Footnotes
1. Reaction mixture heated under reflux for final 2 hours. pH adjusted to 10 before extraction with ether.
2. Grignard reagent prepared from Mg and ethyl iodide.
3. The crude product is first crystallized from acetone to give trans-6-(1-hydroxy-n-propyl)-5-phenyl-2,3,5,6-tetrahydroimidazo[2,1-b]thiazole, m.p. 176°C. The mother liquors are treated with ethereal HCl and the precipitated hydrochloride salt recrystallized.
4. Grignard reagent prepared from Mg and n-propyl bromide.
5. Heated to reflux for 2 hours. The crude product is converted to its hydrochloride salt which is recrystallized.
6. Grignard reagent prepared from Mg and vinyl bromide. Crude product purified by column chromatography on silica, eluting with ethyl acetate.
7. Grignard reagent prepared from Mg and benzyl bromide. The crude product is purified by chromatography on 1 mm. silica plates developed with chloroform/ethyl acetate 1:1.

EXAMPLE 25

A mixture of ethyl 3-(3-trifluoromethylphenyl)-2,3-dibromopropionate (8.0 g.), 2-aminothiazoline (2.2 g.)

and triethylamine (4.0 g.) in ethyl acetate is heated to reflux under nitrogen for 7 hours. The cooled mixture is filtered, the filtrate cooled to 10°C and N.HCl (40 ml.) added. The mixture is stirred for 15 minutes, the solid is filtered off and treated with alkali to give cis-6-ethoxycarbonyl-5-(3-trifluoromethylphenyl)-2,3,5,6-tetrahydroimidazo[2,1-b]thiazole, m.p. 120°–122°C. on recrystallisation from petroleum ether, b.p. 80°–100°C.

The acidic filtrate is cooled to 10°C., made alkaline and the resulting solid filtered and recrystallised from petroleum ether, b.p. 80°–100°C., to give the corresponding trans isomer, m.p. 111°–113°C.

EXAMPLE 26

A solution of methyl 2-bromo-3-(4-dimethylaminophenyl)acrylate (1.4 g.), triethylamine (0.7 ml.) and 2-aminothiazoline (0.5 g.) in dioxan (50 ml.) is heated to reflux under nitrogen for 22 hours. The cooled mixture is evaporated to dryness, the residue partitioned between water and ethyl acetate, and the ethyl acetate extract chromatographed on silica using ethyl acetate as eluting solvent to give trans-5-(4-dimethylaminophenyl)-6-methoxycarbonyl-2,3,5,6-tetrahydroimidazo[2,1-b]thiazole as an oil. [n.m.r. in $CDCl_3$ solution: 7.28δ (2H,d); 6.7δ (2H,d); 4.8δ (1H,d); 4.6δ (1H,d); 3.75δ (3H,s); 2.8δ (4H,m); 2.95δ (6H,s)].

EXAMPLE 27

A solution of ethyl 2,3-dibromo-3-(4-nitrophenyl)-propionate (175 g.) in ethyl acetate (500 ml.) is added under nitrogen to a solution of 2-aminothiazoline (53 g.) and triethylamine (130 ml.) in ethyl acetate (500 ml.) over 0.5 hours. The resulting mixture is stirred at 20°C. for 1 hour then heated to reflux under nitrogen for 1 hour. The cooled mixture is filtered, the filtrate washed well with water and cooled below 10°C. N.HCl (600 ml.) is added, the mixture is stirred for 0.5 hours and the resulting solid filtered off and recrystallised from ethanol to give cis-6-ethoxycarbonyl-5-(4-nitrophenyl)-2,3,5,6-tetrahydroimidazo[2,1-b]thiazole hydrochloride, m.p. 250°C., which affords a free base, m.p. 125-127°C. on recrystallisation from acetone/petroleum ether, (b.p. 80-100°C.)

The aqueous acidic filtrate is cooled, made alkaline and extracted with ethyl acetate. The residue obtained by evaporation of the organic extract is purified on a silica column using ethyl acetate as solvent to give the corresponding trans isomer as the free base, m.p. 115°C. on recrystallisation from acetone/petroleum ether (b.p. 80°-100°C.)

EXAMPLE 28

A mixture of ethyl 2,3-dibromo-3-(3-nitrophenyl)-propionate (96.0 g.), 2-aminothiazoline (28.0 g.) and triethylamine (70 ml.) in ethyl acetate (11.) is heated to reflux under nitrogen for 6 hours. The cooled mixture is filtered, the filtrate washed well with water and then stirred with N.HCl (300 ml.). The well stirred mixture is cooled to 10°C., the hydrochloride salt is filtered off and converted to the free base of cis-6-ethoxycarbonyl-5-(3-nitrophenyl)-2,3,5,6-tetrahydroimidazo[2,1-b]thiazole, m.p. 87°–90°C. from methanol.

The acidic aqueous filtrate is made alkaline and extracted with ethyl acetate. The solvent is evaporated and the residue recrystallised from ethyl acetate to give the corresponding trans isomer, m.p. 129°–131°C.

EXAMPLE 29

A solution of trans-6-ethoxycarbonyl-5-phenyl-2,3,5,6-tetrahydroimidazo[2,1-b]thiazole (1.38 g.) in dry tetrahydrofuran (20 ml.) under nitrogen is cooled to 0°C. Lithium aluminium hydride (0.1 g.) is added and the mixture stirred at 20°C. for 60 hours. Water (b 2 ml.) is added, the mixture is evaporated to dryness and the residue is partitioned between water and ethyl acetate. The organic extract is evaporated to dryness and the residue recrystallised from acetone to give trans-6-hydroxymethyl-5-phenyl-2,3,5,6-tetrahydroimidazo[2,1-b]thiazole, m.p. 155°C.

EXAMPLE 30

The process described in Example 29 is repeated using an equivalent amount of the appropriate 6-ethoxycarbonyl derivative as starting material in place of trans-6-ethoxycarbonyl-5-phenyl-2,3,5,6-tetrahydroimidazo[2,1-b]thiazole, and the following compounds are obtained.

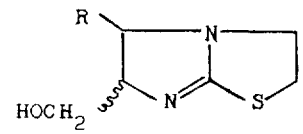

| R | Isomer | Reaction time (hrs) | m.p.°C. | Recrystallisation solvent | Footnote |
|---|---|---|---|---|---|
| Phenyl | cis | 60 | 140–145 | acetone | |
| 3,4-Dichlorophenyl | trans | 60 | 184–186 | acetone/petroleum ether (b.p. 80–100°C) | |
| 3,4-Dichlorophenyl | cis | 60 | 187–191 | acetone/ethanol | |
| 3-Trifluoromethylphenyl | trans | 16 | 140–141 | petroleum ether (b.p. 80–100°C) | 1 |
| 3-Trifluoromethylphenyl | cis | 16 | 189–190 | ethyl acetate | 1 |
| 4-Nitrophenyl | trans | 4 | 218–222 | ethanol | |
| 3-Nitrophenyl | trans | 16 | 183–185 | methanol | |

Footnote
1. Reaction worked up by pouring onto ice, filtering the resulting solid and extracting the solid with ethyl acetate.

EXAMPLE 31

The process described in Example 24 is repeated using an equivalent amount of a 6-ethoxycarbonyl derivative as starting material, and the following compounds are thus prepared.

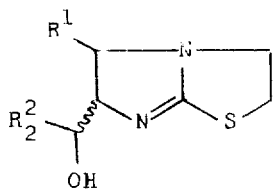

| $R^1$ | $R^2$ | Isomer | Reaction time (hrs) | Salt | m.p.°C | Recrystall- isation solvent | Foot- note |
|---|---|---|---|---|---|---|---|
| 3,4-Dichloro- phenyl | $C_2H_5$ | trans | 3 | hydrochlo- ride | 225–230 | ethanol | 1,2 |
| 3,4-Dichloro- phenyl | $C_2H_5$ | cis | 3 | free base | 186–187 | ethanol/ acetone | 1,2 |
| 3,4-Dichloro- phenyl | $CH_3$ | trans | 3 | free base | 125–128 | acetone/ petroleum ether(b.p 80–100°C.) | 2,3 |
| 3,4-Dichloro- phenyl | $CH_3$ | cis | 3 | free base | 145–150 | acetone/ petroleum ether (b.p 80–100°C.) | 2,3 |
| 3-Trifluoro- methylphenyl | $CH_3$ | trans | 16 | free base | 44–46 | ether | |
| 3-Trifluoro- methylphenyl | $CH_3$ | cis | 16 | free base | 141–142 | ethyl acetate | |
| 4-Dimethyl- aminophenyl | $CH_3$ | trans | 1 | free base | | | |
| 3-Trifluoro- methylphenyl | $C_2H_5$ | trans | 4 | free base | 42–45 | ether | 1,5 |
| 3-Trifluoro- methylphenyl | $C_2H_5$ | cis | 4 | free base | 159–160 | ethyl acetate /petroleum ether(b.p 80–100°C.) | 1,6 |

Footnotes
1. Grignard reagent prepared from Mg and ethyl iodide.
2. Reaction carried out in tetrahydrofuran/ether and worked up with water/ether.
3. Grignard reagent prepared from Mg and methyl iodide.
4. Purified by chromatography on alumina using ethyl acetate as solvent. The product has the following n.m.r. spectrum in $CDCl_3$:-7.24δ(2H,d); 6.68δ(2H,d); 4,28δ(2H,s); 3.3δ(4H,m); 2.95δ(6H,s); 2.55δ(OH); 1.28δ(3H,s); 1.22δ(3H,s).
5. Crude product purified on 1 mm. silica plates using ethyl acetate as developing solvent.
6. Reaction mixture stirred for a further hour at reflux under nitrogen before work up.

EXAMPLE 32

Benzoyl chloride (0.51 ml.) is added to an ice-cooled solution of trans-6-hydroxymethyl-5-phenyl-2,3,5,6-tetrahydroimidazo[2,1-b]thiazole (0.93 g.) and triethylamine (0.62 ml.) in dry tetrahydrofuran (50 ml.) and the mixture stirred at 20°C. for 2 hours. The solvent is removed and the residue is partitioned between ethyl acetate and cold sodium bicarbonate solution. The organic phase is evaporated and the residue is column chromatographed on silica, using ethyl acetate as solvent, to give trans-6-(1-benzoyloxyethyl)-5-phenyl-2,3,5,6-tetrahydroimidazo[2,1-b]thiazole as a viscous oil. [n.m.r in $d_6$DMSO: 7.85δ (2H,m); 7.48δ(8H,m); 4.4δ (4H,m); 3.30δ(4H,m)].

EXAMPLE 33

A 0.323M solution of di-isonorbornyl aluminium isopropoxide (14 ml.) in toluene is added under nitrogen to a solution of trans-6-acetyl-5-phenyl-2,3,5,6-tetrahydroimidazo[2,1-b]thiazole (0.5 g.) in dry toluene (6 ml.) and the mixture is stirred for 60 hours at 20°C. The mixture is added to a 5 percent w/v sodium potassium tartrate solution (50 ml), ethyl acetate is then added, and the organic phase separated. Evaporation of the ethyl acetate gives a mixture of the diastereoisomers of trans-6-(1-hydroxyethyl)-5-phenyl-2,3,5,6-tetrahydroimidazo[2,1-b]thiazole. (n.m.r. indicates an erythro/threo ratio of 80:20).

Recrystallisation from acetone furnishes the pure erythro isomer, m.p. 142°C.

EXAMPLE 34

A solution of 0.5M potassium tri-s-butylborohydride in tetrahydrofuran (35 ml.) is added under nitrogen to an ice-cooled solution of trans-6-acetyl-5-phenyl-2,3,5,6-tetrahydroimidazo[2,1-b]thiazole (2.46 g.) in dry tetrahydrofuran (35 ml.). The mixture is then stirred at 20°C. for 18 hours. Water (2 ml.) is added and the solvents are evaporated. The residue is partitioned between ethyl acetate and N.HCl. The acid phase is made alkaline and extracted three times with ethyl acetate. Evaporation of this extract gives a mixture of the diastereoisomers of trans-6-(1-hydroxyethyl)-5-phenyl2,3,5,6-tetrahydroimidazo[2,1-b]thiazole. (n.m.r. indicates an erythro/threo ratio of 35:65)

EXAMPLE 35

A solution of trans-6-acetyl-5-phenyl-2,3,5,6-tetrahydroimidazo[2,1-b]thiazole (1.23 g.) in dry tetrahydrofuran (15 ml.) is gradually added under nitrogen to an ice-cooled solution of dicyclohexylborane in tetrahydrofuran [prepared by the addition of a solution of cyclohexene (1.01 ml) in dry tetrahydrofuran (5 ml.) to a 1M solution of diborane in tetrahydrofuran (5 ml.)]. The reaction is stirred at 20°C. for 20 hours. Water (2 ml.) is added and the tetrahydrofuran evaporated. The residue is treated with 2N.sodium hydroxide solution and extracted three times with ethyl acetate. The combined organic phases are extracted with 2N.HCl and the acid layer is separated and made alkaline. Extraction with ethyl acetate and evaporation of the extract gives a mixture of the diastereoisomers of trans-6-(1-hydroxethyl)-5-phenyl-2,3,5,6-tetrahydroimidazo[2,1-b]thiazole, (n.m.r. indicates an erythro/threo ratio of 80:20).

EXAMPLE 36

Lithium aluminium hydride (0.048 g.) is added gradually to a solution of trans-6-acetyl-5-phenyl-2,3,5,6-tetrahydroimidazo[2,1-b]thiazole (1.23 g.) in dry tetrahydrofuran (30 ml.) and the mixture is stirred at 20°C. for 20 hours. Ethyl acetate is added and the solvent is evaporated. The residue is partitioned between ethyl acetate and water. Evaporation of the organic phase gives a mixture of the diastereoisomers of trans-6-(1-hydroxyethyl)-5-phenyl2,3,5,6-tetrahydroimidazo[2,1-b]thiazole. (n.m.r. indicates an erythro/threo ratio of 65:35).

EXAMPLE 37

A solution of 0,0'-di-p-toluoyl-(D)-tartaric acid (7.6 g.) in isopropanol (100 ml.) is added to a solution of racemic trans-5-(3,4-dichlorophenyl)-6-(1-hydroxy-1-methylethyl)-2,3,5,6-tetrahydroimidazo[2,1-b]thiazole (6.2 g.) in isopropanol (100 ml.). The mixture is seeded and allowed to stand overnight. The mixture is filtered and the solid is recrystallised from ethanol (50 ml.) to give the acid tartrate of the (+) isomer, m.p. 149°C. This salt is shaken with a mixture of ethyl acetate (100 ml.) and 0.5N.sodium hydroxide solution (80 ml.). The ethyl acetate layer is separated, washed with water, dried and evaporated to give a syrup which readily crystallised. Trituration with petroleum ether (b.p. 40°–60°C.) gives (+)-trans-5-(3,4-dichlorophenyl)-6-(1-hydroxy-1-methylethyl)-2,3,5,6-tetrahydroimidazo[2,1-b]-thiazole, m.p. 135°–136°C., $[\alpha]_D^{25}$ + 155°C. (c., 2 in ethyl acetate).

The isopropanol filtrate from the salt preparation is evaporated and the resultant viscous gum is converted by treatment with 0.5N. sodium hydroxide and ethyl acetate extraction to the (−) rich base, which is obtained as a syrup. Recrystallisation from ether gives (−)-trans-5-(3,4-dichlorophenyl)-6-(1-hydroxy-1-methylethyl)-2,3,5,6-tetrahydroimidazo[2,1-b]thiazole, m.p. 135°C. $[\alpha]_D^{25}$ −153°C. (c., 2 in ethyl acetate).

EXAMPLE 38

A 60 % sodium hydride dispersion (0.12 g.) is added under nitrogen to a solution of trans-5-(3,4-dichlorophenyl)-6-(1-hydroxy-1-methylethyl)-2,3,5,6-tetrahydroimidazo[2,1-b]thiazole (1.0 g.) in dry tetrahydrofuran (20 ml.) and the solution is stirred at room temperature for 2 hours. Methyl iodide (0.19 ml.) is then added under nitrogen and the mixture is stirred at 20°C. for 16 hours. The solvent is removed and the residue is partitioned between ethyl acetate and water. The gum obtained by evaporation of the organic layer is column chromatographed on silica, using ethyl acetate as solvent, to give trans-5-(3,4-dichlorophenyl)-6-(1-methoxy-1-methylethyl)-2,3,5,6-tetrahydroimidazo[2,1-b]thiazole, m.p. 96°–100°C. on recrystallisation from petroleum ether (b.p. 60°–80°C.).

EXAMPLE 39

The process described in Example 38 is repeated using an equivalent amount of benzyl or allyl bromide as starting material in place of methyl iodide, and the following compounds are thus obtained. N.m.r. signals are of a solution in CDCl₃.

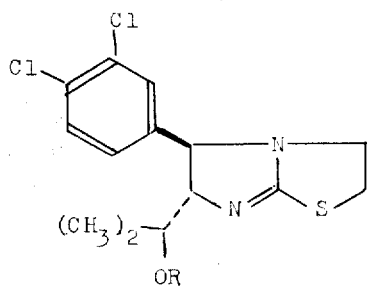

| R | δ value |
|---|---|
| Benzyl | 7.3 (8H,d) |
| | 4.52 (1H,d) |
| | 4.40 (2H,s) |
| | 4.28 (1H,d) |
| | 3.4 (4H,m) |
| | 1.4 (3H,s) |
| | 1.3 (3H,s) |
| Allyl | 7.52 (1H,d) |
| | 7.42 (1H,d) |
| | 7.25 (1H,doubled) |
| | 5.8 (1H,m) |
| | 5.15 (2H,m) |
| | 4.45 (1H,d) |
| | 4.32 (1H,d) |
| | 3.5 (6H,m) |
| | 1.3 (3H,s) |
| | 1.24 (3H,s) |

EXAMPLE 40

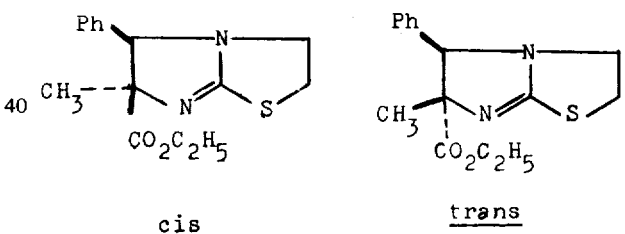

To a stirred solution of trans-6-ethoxycarbonyl-5-phenyl-2,3,5,6-tetrahydroimidazo[2,1-b]thiazole (5.4 g.) in dry dimethylformamide (100 ml.) under nitrogen is added portionwise over 2 minutes sodium hydride (1.0 g. of an 80 percent dispersion in oil), the internal temperature being maintained at 30°–35°C. by cooling. The resulting yellow solution is stirred at 20°C. for 30 minutes, methyl iodide (2 ml.) is added dropwise over 2 minutes and the mixture is stirred for a further 15 minutes at 20°C. Water (100 ml.) is added and the mixture extracted with ethyl acetate (2×100 ml.). The combined extracts are washed with water (100 ml.) and dried (MgSO₄) and the solvent is evaporated to give an oil which is a mixture of 85 percent cis- and 15 percent trans-6-ethoxycarbonyl-6-methyl-5-phenyl-2,3,5,6-tetrahydroimidazo[2,1-b]thiazole as estimated by the n.m.r. spectrum [cis δ values are 4.22 (s) 1H; 1.68 (s) 3H; 0.82 (t) 3H $J_{AB}$ = 7 c.p.s. : trans δ values are 4.93 (s) 3H; 1.00 (t) 3H; 1.31 (t) 3H $J_{AB}$ = 7 c.p.s.]

The oil is dissolved in ether (20 ml.), petroleum ether (b.p. 60°–80°C.) is added until the solution just becomes cloudy. This mixture is warmed to 40°C., allowed to stand in an open vessel for 16 hours, and the pure trans isomer is filtered off, m.p. 74°-75°C.

The above process is repeated using an equivalent amount of cis-6-ethoxycarbonyl-5-phenyl-2,3,5,6-tetrahydroimidazo[2,1-b]thiazole as starting material in place of the corresponding trans isomer and there is thus obtained the same cis/trans mixture of 6-ethoxycarbonyl-6-methyl-5-phenyl-2,3,5,6-tetrahydroimidazo[2,1-b]thiazole.

EXAMPLE 41

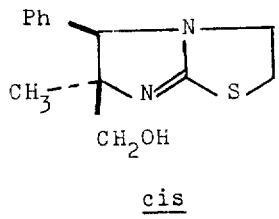

cis

A mixture of cis-6-ethoxycarbonyl-6-methyl-5-phenyl-2,3,5,6-tetrahydroimidazo[2,1-b]thiazole (0.8 g.) and lithium aluminium hydride (0.8 g.) in dry tetrahydrofuran (50 ml.) is heated to reflux and stirred for 2 hours under nitrogen, and then cooled to 20°C. while water (1.0 ml.), 2N. sodium hydroxide (1.0 ml.) and water (3.0 ml.) are successively added with vigorous stirring. The mixture is filtered after 20 minutes, and the solid washed with ethyl acetate. The combined filtrates are evaporated to give an oil which is crystallised from acetone/ether to give cis-6-hydroxymethyl-6-methyl-5-phenyl-2,3,5,6-tetrahydroimidazo[2,1-b]thiazole, m.p. 151°-153°C.

EXAMPLE 42

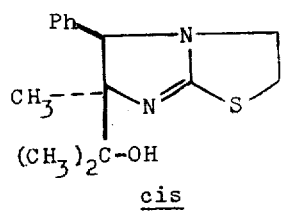

cis

To a solution of methyl magnesium iodide in dry ether [prepared from Mg (1.3 g.) and methyl iodide (3 ml.)] is added under nitrogen a solution of cis-6-ethoxycarbonyl6-methyl-5-phenyl-2,3,5,6-tetrahydroimidazo[2,1-b]thiazole (1.5 g.) in dry ether (50 ml.) and the mixture is stirred and heated to reflux for 16 hours. The mixture is cooled in ice and stirred vigorously while 2N. ammonium chloride solution (100 ml.) is added and the resulting mixture is extracted with ethyl acetate (2×100 ml.). The combined organic extracts are dried (MgSO₄), the solvent evaporated and the residue recrystallised from ethyl acetate to give cis-6-(1-hydroxy-1-methyl)ethyl-6-methyl-5-phenyl-2,3,5,6-tetrahydroimidazo[2,1-b]thiazole, m.p. 150°-153°C.

EXAMPLE 43

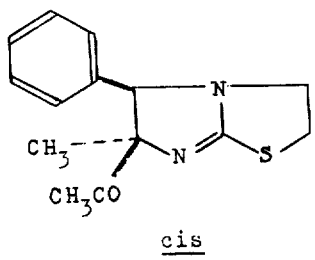

cis

An 80 percent sodium hydride dispersion (0.33 g.) is added to a cooled (<10°C.) solution of trans-6-acetyl-5-phenyl-2,3,5,6-tetrahydroimidazo[2,1-b]thiazole (2.5 g.) in dry tetrahydrofuran (20 ml.) and the solution is stirred under nitrogen for 20 minutes. A solution of methyl iodide (0.7 ml.) in dry tetrahydrofuran (10 ml.) is added gradually over a period of 10 minutes and the mixture is then stirred at room temperature for 16 hours. Methanol (1 ml.) is added, the solvent is evaporated and the residue is partitioned between ethyl acetate and N.sodium hydroxide. The ethyl acetate extract is evaporated and the residue is recrystallised from ethyl acetate containing charcoal to give cis-6-acetyl-6-methyl-5-phenyl-2,3,5,6-tetrahydroimidazo[2,1-b]thiazole, m.p. 125°-127°C.

EXAMPLE 44

The process described in Example 43 is repeated using an equivalent amount of ethyl bromide in place of methyl iodide as starting material and the following cis isomer is thus obtained.

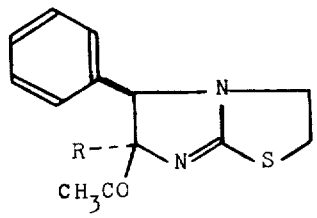

| R | m.p.°C |
|---|---|
| C₂H₅ | 90–92°C. |

EXAMPLE 45

Sodium borohydride (0.08 g.) is added to an ice-cooled solution of cis-6-acetyl-6-methyl-5-phenyl-2,3,5,6-tetrahydroimidazo[2,1-b]thiazole (0.52 g.) in ethanol (20 ml.) and the mixture is stirred at 20°C. for 4 hours. The ethanol is evaporated and the residue is partitioned between 2N.HCl and ethyl acetate. The acid layer is separated, cooled and made alkaline and the resulting precipitate is filtered and recrystallised from acetone to give cis-6-(1-hydroxyethyl)-6-methyl-5-phenyl-2,3,5,6-tetrahydroimidazo[2,1-b]thiazole as a single diastereoisomer, m.p. 136°-137°C. [n.m.r. spectrum in d₆DMSO has the following characteristic resonances: 4.22δ (1H,s); 1.35δ (3H,s); 0.95δ (3H,d)].

EXAMPLE 46

The process described in Example 45 is repeated using an equivalent amount of cis-6-acetyl-6-ethyl-5-phenyl-2,3,5,6-tetrahydroimidazo[2,1-b]thiazole as starting material in place of cis-6-acetyl-6-methyl-5-phenyl-2,3,5,6-tetrahydroimidazo[2,1-b]thiazole, and the following compound is obtained as a single diastereoisomer.

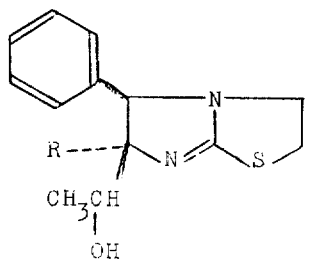

| R | m.p. °C. | Recrystallisation solvent | Footnote |
|---|---|---|---|
| $C_2H_5$ | 164–166 | ethyl acetate | 1 |

Footnote
1. N.m.r. spectrum in $d_6$DMSO has the following characteristic resonances: 4.68δ(1H,s); 0.88δ(3H,d).

EXAMPLE 47

A solution of cis-6-acetyl-6-methyl-5-phenyl-2,3,5,6-tetrahydroimidazo[2,1-b]thiazole (0.52 g.) in dry ether (20 ml.) and dry tetrahydrofuran (5 ml.) is added under nitrogen to the Grignard reagent prepared from magnesium (0.10 g.) and methyl iodide (0.25 ml.) in dry ether (10 ml.) and the mixture is stirred for 16 hours at room temperature. A further Grignard solution derived from magnesium (0.05 g.) and methyl iodide (0.13 ml.) is added and the mixture is refluxed under nitrogen for 5 hours. Ethyl acetate and water are added and the organic phase is separated and extracted with N.HCl. The aqueous acid layer is made alkaline and extracted with ethyl acetate. Evaporation of the extract and recrystallisation of the residude from ethyl acetate gives cis-6-(1-hydroxy-1-methylethyl)-6-methyl-5-phenyl-2,3,5,6-tetrahydroimidazo[2,1-b]thiazole, m.p. 158°–159°C. whose n.m.r. and infrared spectra are identical with those of the compound described in Example 42.

EXAMPLE 48

A suspension of lithium acetylide ethylenediamine complex (1.84 g.) in dry dioxan (130 ml.) is saturated with dry acetylene. Trans-6-ethoxycarbonyl-5-(3,4-dichlorophenyl)-2,3,5,6-tetrahydroimidazo[2,1-b]thiazole (1.7 g.) in dry dioxan (50 ml.) is added quickly to the saturated solution and the mixture is stirred at 20°C. for 2 hours. Nitrogen is then bubbled through the mixture to remove excess acetylene. Water (1 ml.) is added, the solvents removed by evaporation and the residue partitioned between ethyl acetate and 2N.HCl. The acid layer is separated, made alkaline and extracted with ethyl acetate. The residue from this extract is purified by chromatography on a column of silica using ethyl acetate as solvent, to give trans-6-(1-ethynyl-1-hydroxyprop-2-ynyl)-5-(3,4-dichlorophenyl)-2,3,5,6-tetrahydroimidazo[2,1-b]thiazole, whose hydrochloride salt has m.p. > 330°C. on recrystallisation from ethyl acetate/ethanol.

What we calim is:-
1. An imidazoheterocyclic derivative of the formula:

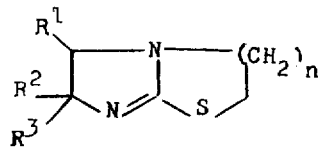

wherein $R^1$ is hydrogen, an unsubstituted phenyl, naphthyl, furyl, thienyl or pyridyl or a phenyl substituted by one or two substituents selected from the group consisting of halogen, alkyl, haloalkyl, alkoxy and alkylthio of 1 to 4 carbon atoms, dialkylamino and alkanoylamine of up to 6 carbon atoms and nitro; $R^2$ is a radical of the formula $R^4CO$ or a radical of the formula:

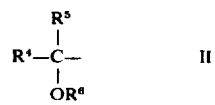

wherein $R^4$ is hydrogen, alkyl of 1 to 6 carbon atoms, alkenyl or alkynyl of up to 6 carbon atoms, phenylalkyl of up to 8 carbon atoms, thienyl, phenyl or phenyl substituted by a halogen; $R^5$ is hydrogen, alkyl of 1 to 6 carbon atoms, alkenyl or alkynyl of up to 6 carbon atoms or phenylalkyl of up to 8 carbon atoms; $R^6$ is hydrogen, alkyl of 1 to 6 carbon atoms, alkenyl or alkynyl of up to 6 carbon atoms, phenylalkyl or alkanoyl of up to 8 carbon atoms or benzoyl; $R^3$ is hydrogen or alkyl of 1-2 carbon atoms; and n is 1 or 2; and the non-toxic pharmaceutically-acceptable acid-addition salts thereof.

2. An imidazo heterocyclic derivative as claimed in claim 1 wherein $R^1$ and $R^2$ are trans to each other.

3. An imidazo heterocyclic derivative as claimed in claim 2 wherein $R^2$ is a radical of the formula:

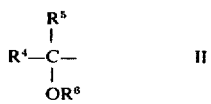

wherein $R^4$ is hydrogen, methyl, ethyl, n-propyl, or vinyl, $R^5$ is methyl, ethyl, n-propyl or vinyl, $R^6$ is hydrogen and n is 1.

4. An imidazo heterocyclic derivative selected from the group consisting of trans-6-(1-hydroxy-1-methyl-n-butyl)-5-phenyl-2,3,5,6-tetrahydroimidazo[2,1-b]thiazole, trans-5-(4-dimethylaminophenyl)-6-(threo-1-hydroxyethyl) 2,3,5,6-tetrahydroimidazo[2,1-b]thiazole, trans-6-(1-ethyl-1-hydroxy-n-propyl)-5-phenyl-2,3,5,6-tetrahydroimidazo[2,1-b]thiazole, trans-5-(4-bromophenyl)-6-(threo-1-hydroxyethyl)-2,3,5,6-tetrahydroimdazo[2,1-b]thiazole, trans-6-(1-hydroxy-1-methylethyl)-5-(3-trifluoromethylphenyl)-2,3,5,6-tetrahydroimidazo[2,1-b]thiazole, trans-5-(3,4-dichlorophenyl)-6-(1-ethyl-1-hydroxy-n-propyl)-2,3,5,6-tetrahydroimidazo[2,1-b]thiazole and cis-5-(3,4-dichlorophenyl)-6-(1-ethyl-1-hydroxy-n-propyl)-2,3,5,6-tetrahydroimidazo[2,1-b]thiazole.

* * * * *